(12) United States Patent
Meisel

(10) Patent No.: US 10,819,105 B2
(45) Date of Patent: Oct. 27, 2020

(54) ELECTRICAL POWER TRANSFORMER AND MOTOR PRE-FLUXING DEVICE

(71) Applicant: David Meisel, Clarkston, MI (US)

(72) Inventor: David Meisel, Clarkston, MI (US)

( * ) Notice: Subject to any disclaimer, the term of this patent is extended or adjusted under 35 U.S.C. 154(b) by 65 days.

(21) Appl. No.: 16/286,009

(22) Filed: Feb. 26, 2019

(65) Prior Publication Data

US 2019/0267798 A1    Aug. 29, 2019

Related U.S. Application Data

(60) Provisional application No. 62/749,364, filed on Oct. 23, 2018, provisional application No. 62/683,380, filed on Jun. 11, 2018, provisional application No. 62/657,376, filed on Apr. 13, 2018, provisional application No. 62/643,559, filed on Mar. 15, 2018, provisional application No. 62/635,778, filed on Feb. 27, 2018.

(51) Int. Cl.
*H02H 9/00* (2006.01)
*H02H 7/04* (2006.01)
*H01H 50/16* (2006.01)
*H01F 27/28* (2006.01)

(52) U.S. Cl.
CPC ............. *H02H 9/002* (2013.01); *H01F 27/28* (2013.01); *H01H 50/16* (2013.01); *H02H 7/04* (2013.01)

(58) Field of Classification Search
CPC .......... H02H 9/002; H02H 7/04; H01F 27/28; H01H 50/16
See application file for complete search history.

(56) References Cited

U.S. PATENT DOCUMENTS

2013/0175879 A1\* 7/2013 Taylor ...................... H02H 7/04
307/125

\* cited by examiner

*Primary Examiner* — Robert L Deberadinis
(74) *Attorney, Agent, or Firm* — Dinsmore & Shohl LLP

(57) ABSTRACT

A pre-fluxing system and method to reduce inrush current for a winding used in a transformer, motor or a solenoid. The system has a primary winding and a tertiary winding connected with a power source for providing electrical energy to these windings. A pre-fluxing circuit is connected to the tertiary winding. The power source provides electrical energy to the tertiary winding via the pre-fluxing circuit, and the pre-fluxing circuit pre-magnetizes the tertiary winding when energized. The tertiary winding is configured to pre-magnetize the primary winding to reduce inrush current when the power source energizes the primary winding.

13 Claims, 4 Drawing Sheets

ELECTRICAL POWER TRANSFORMER AND MOTOR PRE-FLUXING DEVICE

REFERENCE TO RELATED APPLICATIONS

This application claims priority to U.S. Provisional Patent Application Serial Nos. 62/635,778, filed Feb. 27, 2018; 62/643,559, filed Mar. 15, 2018; 62/657,376, filed Apr. 13, 2018; 62/683,380, filed Jun. 11, 2018; and 62/749,364, filed Oct. 23, 2018, the entire content of all of which is incorporated herein by reference.

FIELD OF THE INVENTION

The present invention relates generally to an inrush current suppression technique and, more particularly, to a circuit, method and system for pre-fluxing a winding used in a transformer, motor or a solenoid valve to reduce inrush current.

BACKGROUND OF THE INVENTION

When energizing an electromagnetic coil based device, such as a transformer, motor or solenoid, in an electric power delivery system (such as an electric power generation, transmission, or distribution system, or the like), inrush currents may occur which can be as large as ten times the device's nominal current and can last for up to around half of a second. The actual magnitude of these inrush currents depends on the impedance of the source supplying the device, the residual magnetic flux existing in the device, and the angle of the applied voltage at the time of energization.

Inrush current is also known as input surge current or switch-on surge. The overcurrent protection must react quickly to overload or short-circuit faults but must not interrupt the circuit when the (usually harmless) inrush current flows.

Such high inrush currents have a number of potentially adverse effects. For one, a high inrush current can significantly heat the device's windings and cause deterioration of insulation in the device. In addition, high inrush currents can place large mechanical stresses on the device windings sufficient to displace the windings on the device core which, in the worst case, can break electrical connections within the device. Moreover, insulation compression from displacement of the device windings can result in turn-to-turn faults within the device which, if left undetected, can eventually destroy the device.

Large inrush currents can also disrupt a power system by inappropriately tripping circuit breakers and over-current relays, by causing voltage sags which can affect sensitive equipment, by introducing large harmonic components, and by instigating sympathetic inrush currents in adjacent, parallel-connected devices.

Some prior art inrush current reduction methods which have been previously used or suggested include 1) the use of controlled voltage energization without accounting for the residual flux in the transformer; 2) pre WW1 era resistor-shunt and adjustable autotransformer design topographies; 3) electronic "soft start" algorithm based devices; and 4) the use of controlled voltage energization based on an estimate of the residual flux in the transformer windings.

These prior methods have not been entirely satisfactory for use in power delivery systems because of the complexity, cost or the possible need to measure residual flux levels in the device winding, which can be failure-prone or in some cases require significant upgrade of existing equipment.

Thus, it is desirable to overcome the limitations of the existing inrush current limitation systems and to provide an alternative solution.

SUMMARY OF THE INVENTION

In comparison to the existing systems, the pre-fluxing method, device and system of the present invention may require lower parts count, be lower in cost, have a long life and be easily retrofitted for reducing inrush current in the windings used in a transformer, motor or a solenoid.

The present disclosure presents a pre-fluxing system for a winding used in a transformer, motor or a solenoid to reduce inrush current. The system has a primary winding connected with a power source for providing electrical energy to the primary winding. A tertiary winding is connected with the power source for providing electrical energy to the tertiary winding. The system has a pre-fluxing circuit connected to the tertiary winding. The power source provides electrical energy to the tertiary winding via the pre-fluxing circuit, and the pre-fluxing circuit pre-magnetizes the tertiary winding when energized by the power source. The tertiary winding is configured to pre-magnetize the primary winding to reduce inrush current when the power source energizes the primary winding.

In some embodiments, the pre-fluxing circuit has an LC tank circuit, whereas in other embodiments, the pre-fluxing circuit has a resistor and/or thermistor. According to an embodiment, the pre-fluxing circuit has an electromechanical relay switch with a control coil and a contact set. In some embodiments, the pre-flexing circuit further has a resistor, thermistor and/or LC tank circuit. The control coil is connected in parallel with the tertiary winding and the contact set is a normally-closed type contact set. The power source provides electrical energy to the tertiary winding via the normally-closed type contact and the resistor and/or thermistor. The pre-fluxing circuit is configured to isolate electrical energy from the tertiary winding when the control coil is energized and the normally-closed type contact set opens.

In other embodiments, the control coil is connected in parallel with the tertiary winding and the contact set is a normally-open type contact set. The pre-fluxing circuit is configured to provide electrical energy to the tertiary winding when the control coil is energized, and electrical power to the primary windings is provided via the normally-open type contact set.

In some embodiments, the primary winding and the tertiary winding are part of a shell-type transformer or core-type transformer. In other embodiments, the primary winding and the tertiary winding are part of a twin-coil solenoid valve, and the tertiary winding is embedded in the primary winding of the twin-coil solenoid valve. In some embodiments, the primary winding and the tertiary winding are part of a single-coil center-tapped solenoid valve.

This disclosure also discloses a method of reducing inrush current for a winding used in a transformer, motor or a solenoid by using the pre-fluxing system of this disclosure.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
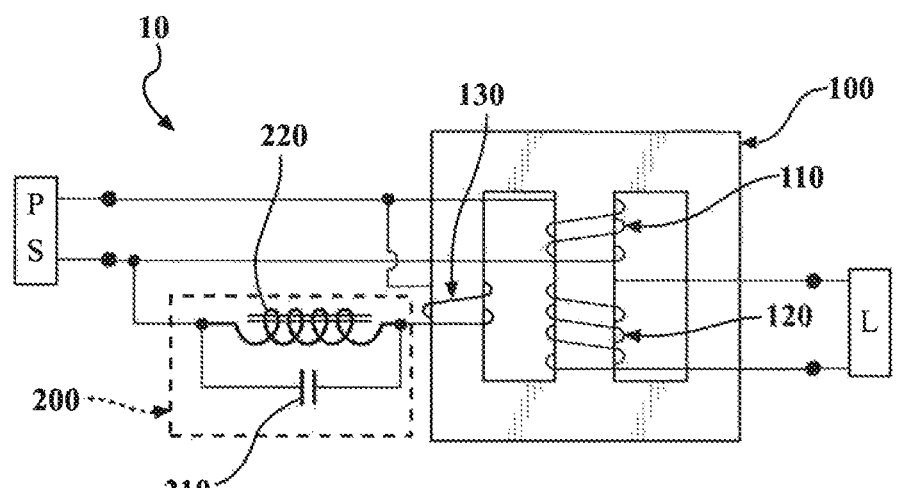
FIG. 1 is a schematic diagram of a shell-type transformer employing an embodiment of a pre-fluxing system according to the present invention.

This invention relates to an inrush current suppression technique for suppressing the inrush current which occurs when a power supply is input to a device such as a transformer. FIG. 1 is a schematic diagram of a shell-type transformer 100 employing an embodiment of a pre-fluxing system 10. The shell-type transformer 100 has a primary winding 110, a secondary winding 120 and a tertiary winding 130 that are wrapped on a laminated core. The terminals of the primary winding 110 may be connected with a power source. When, the primary winding 110 is connected to the power source of alternating voltage, alternating magnetic flux is produced around the primary winding 110. The core provides a magnetic path for the flux, to get linked with the secondary winding 120. All the three windings 110, 120 and 130 are electrically separated but magnetically linked to the each other. As the flux produced is alternating, EMF gets induced in the secondary winding 120. The terminals of the secondary winding 120 may be connected with a load. If the terminals of the secondary winding 120 are connected with the load, then mutually induced current flows through it, and hence electrical energy is transferred from the primary winding 110 to the secondary winding 120.

The tertiary winding 130 in the shell-type transformer 100 may either be pre-installed or may be provided using a suitable technique or method. Similar to the primary winding 110, when a current is injected into the tertiary winding 130 an alternating magnetic flux is produced around the tertiary winding 130. The pre-fluxing system 10 comprises a pre-fluxing circuit 200 that has an inductor 220 and a capacitor 210 configured as an LC tank circuit. In some embodiments, the LC tank circuit is a one-shot ringing tank circuit. The pre-fluxing circuit 10 is connected in series with the tertiary winding 130. The primary winding 110 and the tertiary winding 130 are connected in parallel to each other. Thus, one terminal of the primary winding 110 is connected with a terminal of the tertiary winding 130. The other terminal of the tertiary winding 130 is connected with a terminal of the pre-fluxing circuit 10. The other terminal of the pre-fluxing circuit 10 is in-turn connected with the other terminal of the primary winding 110. A power source provides electrical energy (AC power) to the primary winding 110 and the tertiary winding 130. Unlike prior art designs, wherein the inrush current reduction devices/methods are energized by a separate power sources, the embodiments of the present disclosure are energized, directly or indirectly, from the same power source, i.e. the primary winding and tertiary winding are energized by the same power source and not by a different power source for either winding. Thus, the primary winding as well as the tertiary winding of the present disclosure in any embodiment of this disclosure are energized by the same power source. This feature reduces complexity, requires less part count and makes the retrofit of the device less difficult.

In any embodiment of this invention, the tertiary winding has fewer turns than the primary windings. In a non-limiting example, the ratio between the tertiary winding and the primary winding may vary from about 1:10 to about 1:1000. The AC power used in any embodiment according to this disclosure comprises AC power with the usual-waveform component (e.g. 60 Hz/50 Hz) and the AC power may have high-frequency component from phenomenon such as switch-bounce and harmonics, which may be introduced into an electrical power circuit due to non-linear loads. According to this embodiment, when the pre-fluxing circuit 10 is energized, the LC circuit reacts to both types of AC power within the first few cycles of the AC power (60 Hz/50 Hz) as well as the higher frequency AC power.

The electrical energy causes the LC tank circuit to "ring" or "oscillate", thereby initiating a current in the tertiary winding 130 that is sufficient to pre-magnetize the primary winding 110. Because the tertiary winding 130 has fewer turns, it offers less resistance to the AC power in comparison to the primary winding 110 and pre-magnetizes the primary winding 110 before the onset of high inrush current. The pre-magnetization provides higher inductance to the primary winding 110 and results in lower inrush current during startup. In some embodiments, the LC tank circuit then "Q's-out"/damps out so as to have a high on-state resistance. In some embodiments, inductor 220 is a variable solenoid or a saturable reactor so as to achieve an even higher on-state resistance. This embodiment may be adapted for a transformer of any ampacity and voltage. Non-limiting examples of ampacity and voltage ratings for a single phase transformer are 0.25 KVA, 0.50 KVA, 0.75 KVA, 1 KVA, 3 KVA, 5 KVA, 7.5 KVA . . . 250 KVA, 333 KVA and 120 V, 240 V, 480 V, 600 V . . . 2400 V, 4160 V, respectively. In some embodiments, the voltage rating of the transformers may be up to 345 kV.

Figure 2:
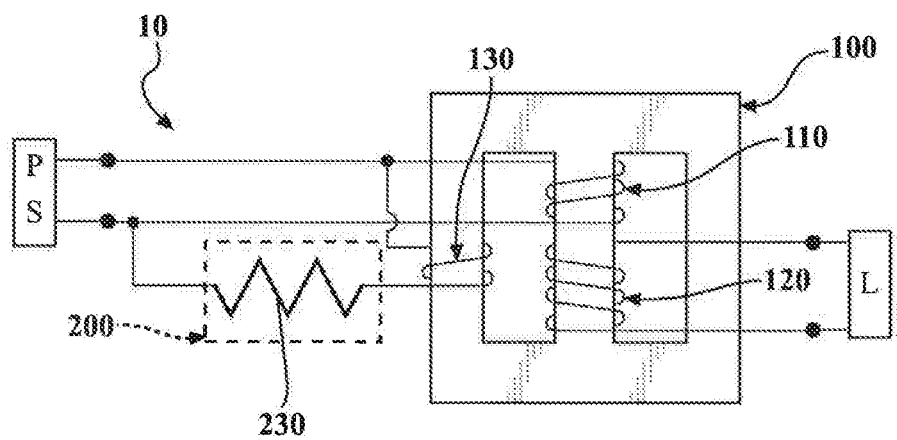
FIG. 2 is a schematic diagram of a shell-type transformer employing an embodiment of a pre-fluxing system according to the present invention.

FIG. 2 is a schematic diagram of a shell-type transformer 100 employing another embodiment of a pre-fluxing system 10. The shell-type transformer 100 has a primary winding 110, a secondary winding 120 and a tertiary winding 130. The tertiary winding 130 in the shell-type transformer 100 may either be pre-installed or may be provided using a suitable technique or method. The pre-fluxing system 10 comprises a pre-fluxing circuit 200 that has a resistor and/or thermistor 230 connected in series with the tertiary winding 130. In some embodiments, a resistor 230 is used in series in with the tertiary winding 130. This embodiment is similar to FIG. 1, except that the LC tank circuit has been replaced with the resistor and/or thermistor 230. When a power source provides electrical energy (AC power) to the primary winding 110 and the tertiary winding 130, the resistor 230 allows a few cycles of AC power to pre-magnetize the tertiary winding 130 that is sufficient to pre-magnetize the primary winding 110.

In other embodiments, a thermistor 230 is used either alone or in combination with a resistor 230, and is connected in series with the tertiary winding 130. For example, a PTC thermistor may be used that has low resistance at low temperatures. When the AC power is provided, the thermistor's 230 resistance permits the initial current. After some time, current flow heats the thermistor 230, and its resistance changes to a higher value, impeding current flow. Thus, a higher on-state resistance can be achieved by the use of a thermistor instead of using a resistor 230 alone. This embodiment may be adapted for any ampacity and voltage transformer.

Because the tertiary winding 130 has fewer turns, it offers less resistance to the AC power in comparison to the primary winding 110 and pre-magnetizes the primary winding 110 before the onset of high inrush current. The pre-magnetization provides higher inductance to the primary winding 110 and results in lower inrush current during startup. This embodiment may be adapted for a transformer of any ampacity and voltage.

Figure 3:
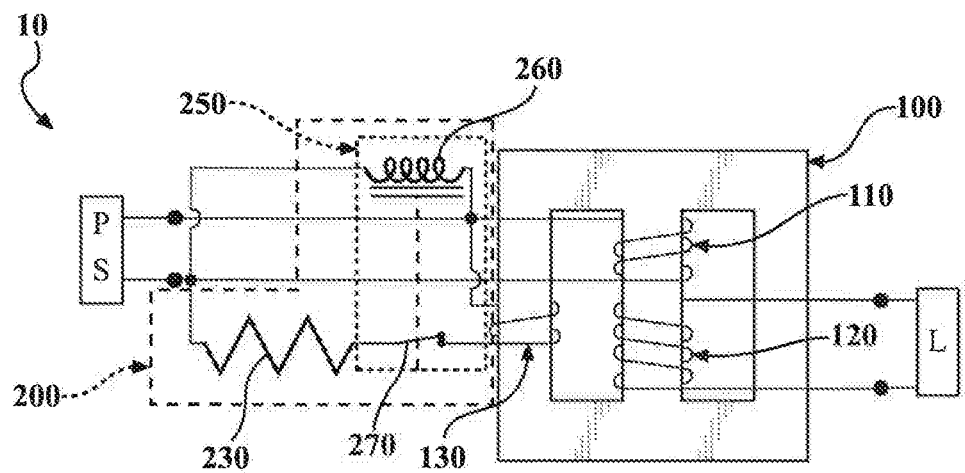
FIG. 3 is a schematic diagram of a shell-type transformer employing an embodiment of a pre-fluxing system according to the present invention.

FIG. 3 is a schematic diagram of a shell-type transformer 100 employing another embodiment of a pre-fluxing system 10. The shell-type transformer 100 has a primary winding 110, a secondary winding 120 and a tertiary winding 130. The tertiary winding 130 in the shell-type transformer 100 may either be pre-installed or may be provided using a suitable technique or method. The pre-fluxing system 10 comprises a pre-fluxing circuit 200 that has an electromechanical starter switch 250 and a resistor 230. The resistor 230 may be a resistor/thermistor/LC tank circuit or a combination of the resistor/thermistor/LC tank circuit. The switch 250 has a control coil 260 and a normally closed (NC) contact set 270. The control coil 260 is connected in parallel with the tertiary winding 130. One terminal of the primary winding 110 is connected with a terminal of the control coil 260 and a terminal of the tertiary winding 130. The other terminal of the control coil 260 is connected with the other terminal of the primary winding 110. The resistor 230 is connected in series with the tertiary winding 130 via NC set 270. The other terminal of the tertiary winding 130 is connected with a terminal of resistor 230 via the NC set 270. The other terminal of the resistor 230 is connected with the other terminal of the primary winding 110. The pre-fluxing circuit 200 is configured to isolate electrical energy from the tertiary winding 130 when the control coil 260 is energized and the NC set 270 opens.

As discussed above, when a power source provides electrical energy (AC power) to the primary winding 110 and the tertiary winding 130, the resistor 230 allows a few cycles of AC power to pre-magnetize the tertiary winding 130 that is sufficient to pre-magnetize the primary winding 110. The pre-magnetization provides higher inductance to the primary winding 110 and results in lower inrush current during startup. The on-state resistance in this embodiment will be as low as the control coil 260. This embodiment may be adapted for a transformer of any ampacity and voltage.

Figure 4:
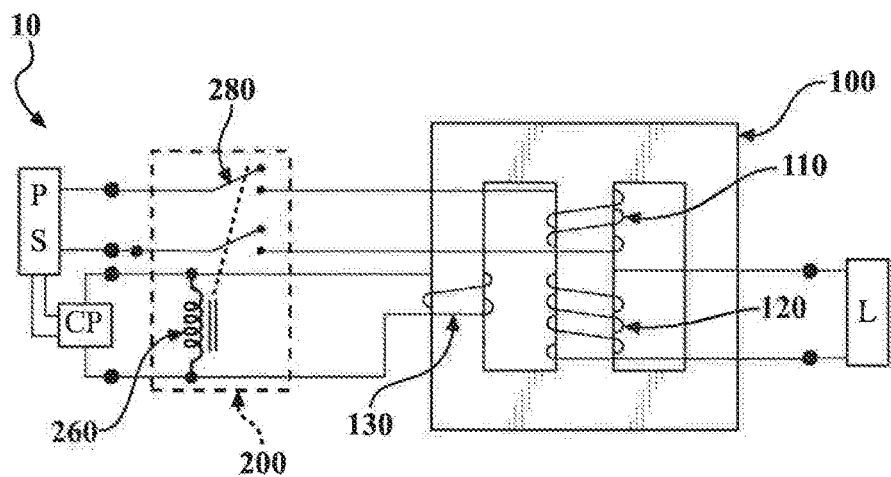
FIG. 4 is a schematic diagram of a shell-type transformer employing an embodiment of a pre-fluxing system according to the present invention.

FIG. 4 is a schematic diagram of a shell-type transformer 100 employing another embodiment of a pre-fluxing system 10. The shell-type transformer 100 has a primary winding 110, a secondary winding 120 and a tertiary winding 130. The tertiary winding 130 in the shell-type transformer 100 may either be pre-installed or may be provided using a suitable technique or method. The pre-fluxing system 10 comprises a pre-fluxing circuit 200 that has an electromechanical starter switch. The switch 200 has a control coil 260 and a normally-open (NO) contact set 280. The control coil 260 is connected in parallel with the tertiary winding 130. One terminal of the control coil 260 is connected with a terminal of the tertiary coil 130 and the other terminal of the control coil 260 is connected with the other terminal of the tertiary coil 130. The terminals of the control coil 260 are connected with the control power. Thus, the control coil 260 as well as tertiary coil 130 are powered by the control power. The power source may either directly provide the control power or the AC power may be conditioned and then used as control power. In a non-limiting example, if the power source is providing 110 V it may be used as such as the control power, but if the power source is providing 4160 V it may be stepped down and then used as the control power. In either case, the power is supplied by only one power source and more than one power source is not used for pre-fluxing. AC power is provided to the primary winding 110 via the NC set 280. The energy source is connected with the terminals of the primary winding 110 via the NC set 280. As soon as the control power energizes the control coil 260, the NC set 280 closes and the primary winding 110 is energized.

In some embodiments, a resistor/thermistor/LC tank circuit or a combination of the resistor/thermistor/LC tank circuit may be connected in series with the tertiary winding 130. As discussed above, when a power source provides electrical energy (AC power) to the primary winding 110 and the tertiary winding 130, the control coil 260 allows a few cycles of AC power to pre-magnetize the tertiary winding 130 that is sufficient to pre-magnetize the primary winding 110. The pre-magnetization provides higher inductance to the primary winding 110 and results in lower inrush current during startup. This embodiment may adapted for a transformer of any ampacity, but generally is limited to less than 500 volts.

Figure 5:
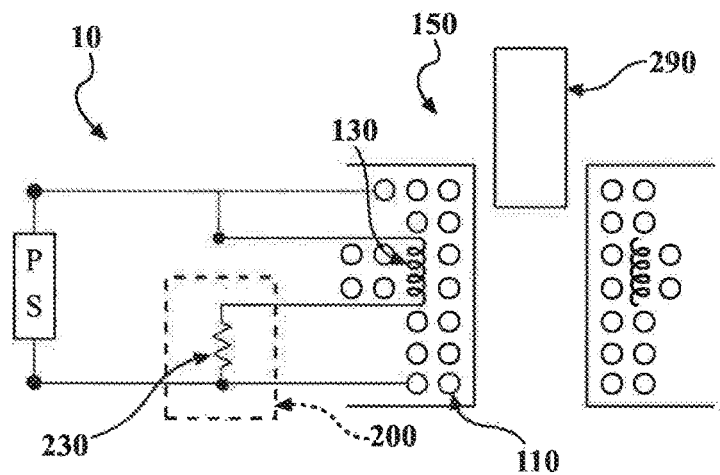
FIG. 5 is a partial cross-sectional view of a solenoid valve with a plunger employing an embodiment of a pre-fluxing system according to the present invention.

FIG. 5 is a partial cross-sectional view of a solenoid valve 150 with a plunger 290 employing an embodiment of a pre-fluxing system 10. The solenoid valve 150 has a primary winding 110 and a tertiary winding 130. The tertiary winding 130 in the solenoid valve 150 may either be pre-installed or may be provided using a suitable technique or method. In a non-limiting example, the primary winding 110 and the tertiary winding 130 are part of a twin-coil solenoid valve 150, and the tertiary winding 130 is embedded in the primary winding 110 of the twin-coil solenoid valve 150. In another non-limiting example, the primary winding 110 and the tertiary winding 130 are part of a single-coil center-tapped solenoid valve 150. The primary winding 110 and the tertiary winding 130 of other embodiments in this disclosure may be part of a single-coil center-tapped transformer.

The pre-fluxing system 10 comprises a pre-fluxing circuit 200 that has a resistor/thermistor/LC tank circuit 230 or a combination of the resistor/thermistor/LC tank circuit that is connected in series with the tertiary winding 130. One terminal of the primary winding 110 is connected with a terminal of resistor 230. The other terminal of the resistor 230 is connected with a terminal of the tertiary winding 130 and the other terminal of the tertiary winding 130 is connected with the other terminal of the primary winding 110.

As discussed above, when a power source provides electrical energy (AC power) to the primary winding 110 and the tertiary winding 130, the resistor 230 allows a few cycles of AC power to pre-magnetize the tertiary winding 130 that is sufficient to pre-magnetize the primary winding 110. This in turn pre-magnetizes the plunger 290. The pre-magnetization provides higher inductance to the primary winding 110 and results in lower inrush current during startup. This reduces the mechanical response time of the solenoid valve 150 and improves the electromechanical propagation delay time. The combination of the pre-fluxing circuit 200 and the tertiary winding 130 in FIG. 5 is similar to the embodiment shown in FIG. 2. A person skilled in the art should be able to employ the pre-fluxing circuits shown in FIGS. 1, 3-4 and 6 for use in solenoid valves.

Figure 6:
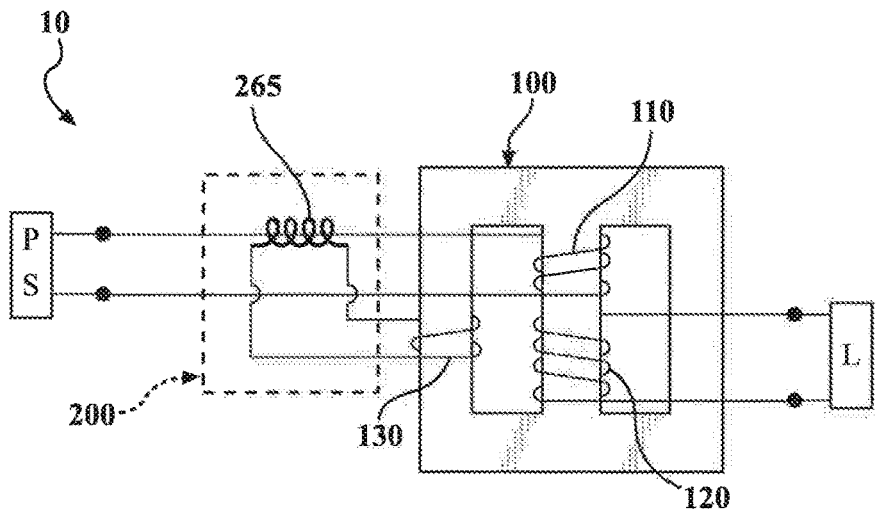
FIG. 6 is a schematic diagram of a shell-type transformer employing an embodiment of a pre-fluxing system according to the present invention.

FIG. 6 is a schematic diagram of a shell-type transformer 100 employing another embodiment of a pre-fluxing system 10. The shell-type transformer 100 has a primary winding 110, a secondary winding 120 and a tertiary winding 130. The tertiary winding 130 in the shell-type transformer 100 may either be pre-installed or may be provided using a suitable technique or method. The pre-fluxing system 10 comprises a pre-fluxing circuit 200 that has a current transformer 265. The current transformer 265 has a ring core (not shown) wound with many turns of windings. One terminal of the current transformer's 265 winding is connected with a terminal of the tertiary winding 130. The other terminal of the current transformer's 265 winding is connected with the other terminal of the tertiary winding 130. Both the terminals of the primary winding 110 are connected with a power source and one conductor of the primary winding 110 is passed through the ring core of the current transformer 265.

As discussed above, when a power source provides electrical energy (AC power) to the primary winding 110, the alternating current in the conductor of the primary winding 110 passing through the current transformer 265 produces an alternating magnetic field in the ring core, which then induces an alternating current in the tertiary winding 130. The induced alternating current pre-magnetizes the tertiary winding 130. A few cycles of AC power to pre-magnetize the tertiary winding 130 is sufficient to pre-magnetize the primary winding 110. The pre-magnetization provides higher inductance to the primary winding 110 and results in lower inrush current during startup. This embodiment may be adapted for a transformer of any ampacity and voltage. As there is no direct electrical connection between the primary winding 110 and the tertiary winding 130, this embodiment provides galvanic isolation that is particularly desirable in electrical circuit over 1 KV. This embodiment may be adapted for other embodiments described in this disclosure. For example, the control coil 260 of FIG. 3 may be replaced with the current transformer 265. A terminal of the current transformer 265 is connected with the a terminal of the tertiary winding 130, and the other terminal of the current transformer 265 is connected to the resistor 230, such that the combination of the resistor 230 and the tertiary winding 130 are energized by the current transformer 265. This arrangement provides galvanic isolation.

Figure 7:
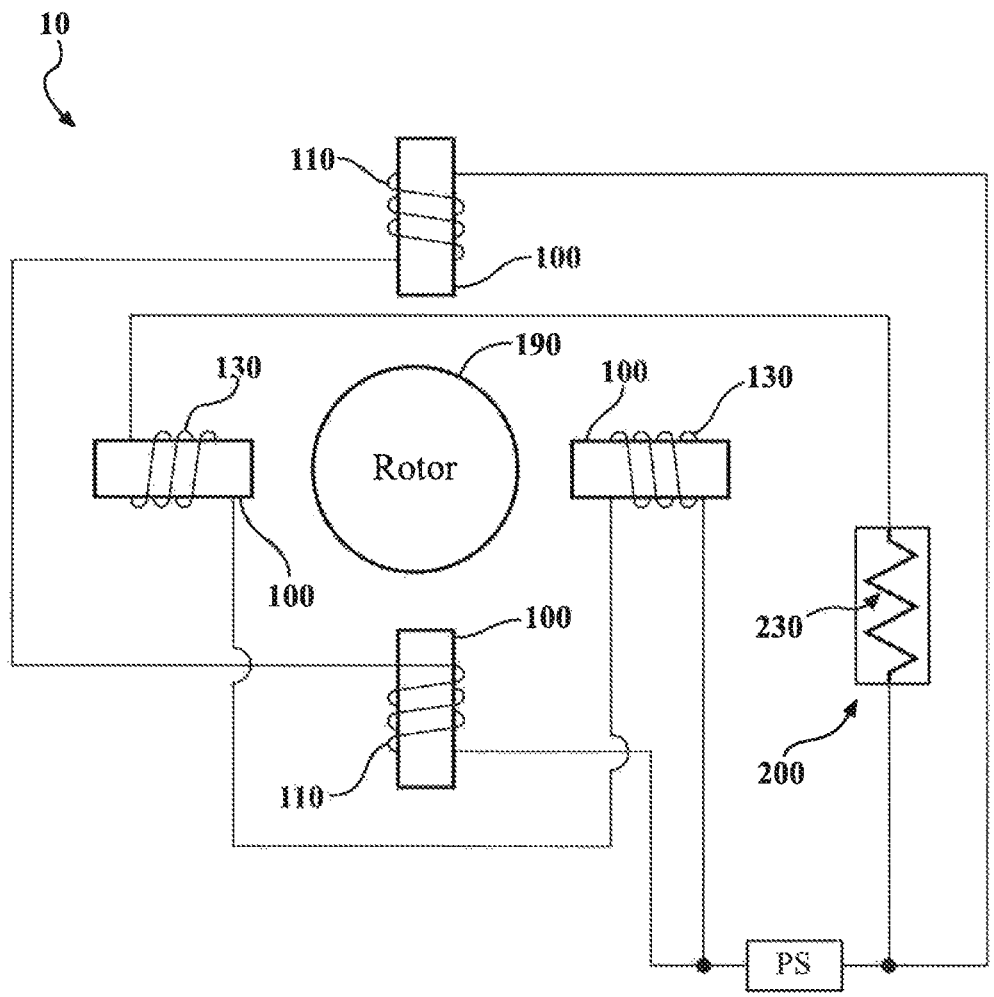
FIG. 7 is a schematic diagram of a split-phase motor employing an embodiment of a pre-fluxing system according to the present invention.

The embodiments of the pre-fluxing system/method discussed in this disclosure may be employed in a core-type transformer, motors or other similar electromagnetic coil based devices. In a non-limiting example, the pre-fluxing circuit of FIG. 2 may be employed in a split-phase motor. FIG. 7 is a schematic diagram of a split-phase motor employing an embodiment of a pre-fluxing system 10. A split-phase motor has a set of run windings 110 and start windings 130, which are used only during the startup. The run windings 110 and start windings 130 are wound on a stator 100 of the motor. After the motor has achieved full-load speed, the start windings 130 are generally isolated by a centrifugal switch. Instead of the centrifugal switch, a pre-fluxing system 10 is used. The pre-fluxing system 10 comprises a pre-fluxing circuit 200 that has a thermistor 230 (similar to FIG. 2).

When a power source provides electrical energy (AC power) to the run windings 110 and the start windings 130, the thermistor 230 allows a few cycles of AC power to pre-magnetize the start windings 130 that is sufficient to pre-magnetize the run windings 110. In some embodiments, a thermistor 230 is used either alone or in combination with a resistor 230, and is connected in series with the start windings 130. For example, a PTC thermistor may be used that has low resistance at low temperatures. When the AC power is provided, the thermistor's 230 resistance passes the initial current. After some time, current flow heats the thermistor 230, and its resistance changes to a higher value, impeding current flow. Thus, a higher on-state resistance can be achieved by the use of a thermistor instead of using a resistor 230 alone. This embodiment may be used in the AC motors with rated value from 1/10 HP to 5 HP. A person skilled in the art would be able to employ other pre-fluxing circuits of this disclosure for use in AC motors.

In some embodiments, instead of two stators 100, all the four stators 100 of the motor may have start windings 130. The four start windings 130 may be connected with one or more thermistor 230. In a non-limiting example, each of the four start windings 130 may be connected with one thermistor 230. Each start winding 130 may be connected in series with a respective thermistor 230 and the combination may be connected individually to the power source, i.e. each start winding 130 is in parallel to the other start winding 130.

Figure 8:
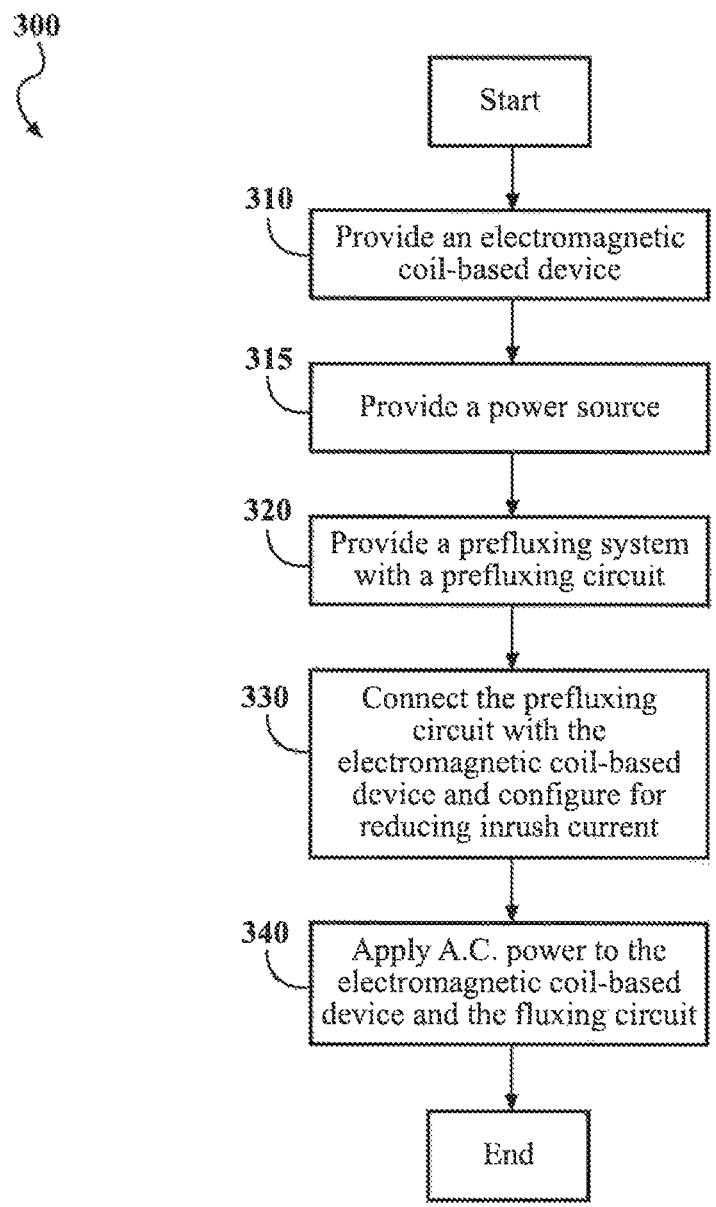
FIG. 8 is flow diagram for a method of reducing inrush current.

FIG. 8 is flow diagram for a method 300 of reducing inrush current. According to an embodiment of method 300, an electromagnetic coil-based device is provided at 310. The device has a winding/coil, and the device may be a transformer, motor, or a solenoid valve. A power source to energize the primary winding and the tertiary winding is provided at 315. A prefluxing system having a pre-fluxing circuit according to this disclosure is provided at 320. A predetermined pre-fluxing circuit is selected that is suitable for the device. At 330, the pre-fluxing circuit is connected with the device and this combination is configured for reducing inrush current. At 340, the pre-fluxing circuit and device are energized, and the pre-fluxing circuit reacts to both types of AC power within the first few cycles of the AC power (60 Hz/50 Hz) as well as the higher frequency AC power. The pre-fluxing circuit initiates a current in a winding of the device that is sufficient to pre-magnetize the winding. The pre-magnetization provides higher inductance to the winding and results in lower inrush current during startup. The steps in FIG. 8 need not be followed in the same sequence as shown. A person skilled in the art would be able to use the embodiments discussed in this disclosure (e.g. FIGS. 1 to 7 and their variants) as per the method 300.

It will be apparent to those skilled in the art that various modifications and variations can be made in the present invention without departing from the spirit or scope of the inventions. Thus, it is intended that the present invention covers the modifications and variations of this invention. The present invention has been described with reference to some embodiments. However, it is realized that variants and equivalents to the preferred embodiments may be provided without departing from the scope of the invention as defined in the accompanying claims. It is to be understood that the detailed description of the present invention are exemplary and explanatory and are intended to provide further explanation of the invention. It is not intended to be exhaustive or to limit embodiments to the precise form disclosed. Changes therein and other uses will occur to those skilled in the art. Such changes and other uses can be made without departing from the scope of the invention as set forth in the following claims.

I claim:

1. A pre-fluxing system for a winding used in a transformer, motor or a solenoid to reduce inrush current, comprising:
   a primary winding connected with a power source for providing electrical energy to the primary winding;
   a tertiary winding connected with the power source for providing electrical energy to the tertiary winding; and
   a pro-fluxing circuit connected to the tertiary winding, the power source providing electrical energy to the tertiary winding via the pro-fluxing circuit, the pre-fluxing circuit pre-magnetizing the tertiary winding when energized by the power source, wherein the tertiary winding is configured to pre-magnetize the primary winding to reduce inrush current when the power source energizes the primary winding.

2. The pre-flexing system of claim 1, wherein the pre-fluxing circuit comprises an LC tank circuit.

3. The pro-fluxing system of claim 1, wherein the pre-fluxing circuit comprises a resistor and/or thermistor.

4. The pre-fluxing system of claim 1, wherein the pre-fluxing circuit comprises an electromechanical relay switch having a control coil and a contact set.

5. The pre-fluxing system of claim 4, wherein the pre-flexing circuit further comprise a resistor, thermistor and/or LC tank circuit, the control coil is connected in parallel with the tertiary winding, the contact set is a normally-closed type contact set, the power source provides electrical energy to the tertiary winding via the normally-closed type contact and the resistor and/or thermistor, and the pre-fluxing circuit is configured to isolate electrical energy from the tertiary winding when the control coil is energized and the normally-closed type contact set opens.

6. The pre-fluxing system of claim 4, wherein the control coil is connected in parallel with the tertiary winding, the contact set is a normally-open type contact set, the pre-fluxing circuit is configured to provide electrical energy to the tertiary winding when the control coil is energized, and electrical power to the primary windings is provided via the normally-open type contact set.

7. The pre-fluxing system of claim 1, wherein the primary winding and the tertiary winding are part of a shell-type transformer or core-type transformer.

8. The pre-fluxing system of claim 1, wherein the primary winding and the tertiary winding are part of a twin-coil solenoid valve, and the tertiary winding is embedded in the primary winding of the twin-coil solenoid valve, transformer or motor.

9. The pre-fluxing system of claim 1, wherein the primary winding and the tertiary winding are part of a single-coil center-tapped solenoid valve.

10. The pre-fluxing system of claim 1, wherein the pro-fluxing circuit comprises a current transformer with a ring core and a winding, the primary winding passes through the ring core and the winding is connected with the tertiary winding.

11. The pre-fluxing system of claim 1, wherein the primary winding and the tertiary winding do not use a different power source.

12. A method of reducing inrush current for a winding used in a transformer, motor or a solenoid, comprising:
    providing a transformer, motor or a solenoid having a primary winding and a tertiary winding;
    providing a power source to energize the primary winding and the tertiary winding;
    providing a pre-fluxing circuit;
    configuring the primary winding, tertiary winding and the pro-fluxing circuit to reduce inrush current;
    energizing the tertiary winding and pre-fluxing circuit by the power source to pro-magnetize the tertiary winding, wherein the tertiary winding is configured to pre-magnetize the primary winding to reduce inrush current when the power source energizes the primary winding.

13. The method of claim 12, wherein a different power source is not used to energize the primary winding and the tertiary winding.

* * * * *